US009730242B2

(12) United States Patent
Caretti et al.

(10) Patent No.: US 9,730,242 B2
(45) Date of Patent: Aug. 8, 2017

(54) METHOD AND SYSTEM FOR SCHEDULING RADIO RESOURCES IN CELLULAR NETWORKS

(71) Applicant: TELECOM ITALIA S.P.A., Milan (IT)

(72) Inventors: Marco Caretti, Turin (IT); Roberto Fantini, Turin (IT); Giuseppe Piro, Matera (IT); Dario Sabella, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 235 days.

(21) Appl. No.: 14/654,015

(22) PCT Filed: Dec. 20, 2012

(86) PCT No.: PCT/EP2012/076455
§ 371 (c)(1),
(2) Date: Jun. 19, 2015

(87) PCT Pub. No.: WO2014/094863
PCT Pub. Date: Jun. 26, 2014

(65) Prior Publication Data
US 2015/0334732 A1    Nov. 19, 2015

(51) Int. Cl.
*H04W 72/12*  (2009.01)
*H04L 12/851*  (2013.01)

(52) U.S. Cl.
CPC ..... *H04W 72/1242* (2013.01); *H04L 47/2433* (2013.01); *H04L 47/2441* (2013.01); *H04W 72/1221* (2013.01)

(58) Field of Classification Search
CPC ............. H04W 72/1242; H04W 72/10; H04W 52/281; H04L 1/1854; H04L 41/5022;
(Continued)

(56) References Cited

U.S. PATENT DOCUMENTS

2002/0161914 A1* 10/2002 Belenki ............... H04L 12/5693
709/235
2003/0185214 A1   10/2003 Yang et al.
(Continued)

FOREIGN PATENT DOCUMENTS

WO    2006/035408 A1    4/2006

OTHER PUBLICATIONS

Yunzhi Qian, et al., "Multi-Service QoS Guaranteed Based Downlink Cross-Layer Resource Block Allocation Algorithm in LTE Systems," Wireless Communications & Signal Processing 2009, IEEE, XP031594628, Nov. 13, 2009, pp. 1-4.
(Continued)

*Primary Examiner* — Hoang-Chuong Vu
(74) *Attorney, Agent, or Firm* — Oblon, McClelland, Maier & Neustadt, L.L.P.

(57) ABSTRACT

A method for scheduling radio resource allocation among active flows within a wireless communication network. The method includes, at each working period of the scheduling method; for each active flow, checking presence of priority data to be transmitted within the current working period. Each active flow having priority data to be transmitted within the current working period is classified as a priority active flow. The remaining active flows are classified as non-priority active flows, the non-priority active flows having non-priority data that need not to be transmitted within the current working period. Radio resources are allocated among the priority active flows, and corresponding priority data are transmitted over the respective allocated resources. After completing priority data transmission, the radio resources are allocated among the non-priority active flows and corresponding non-priority data are transmitted over the respective allocated radio resources until the end of the current working period.

15 Claims, 3 Drawing Sheets

Figure 1:
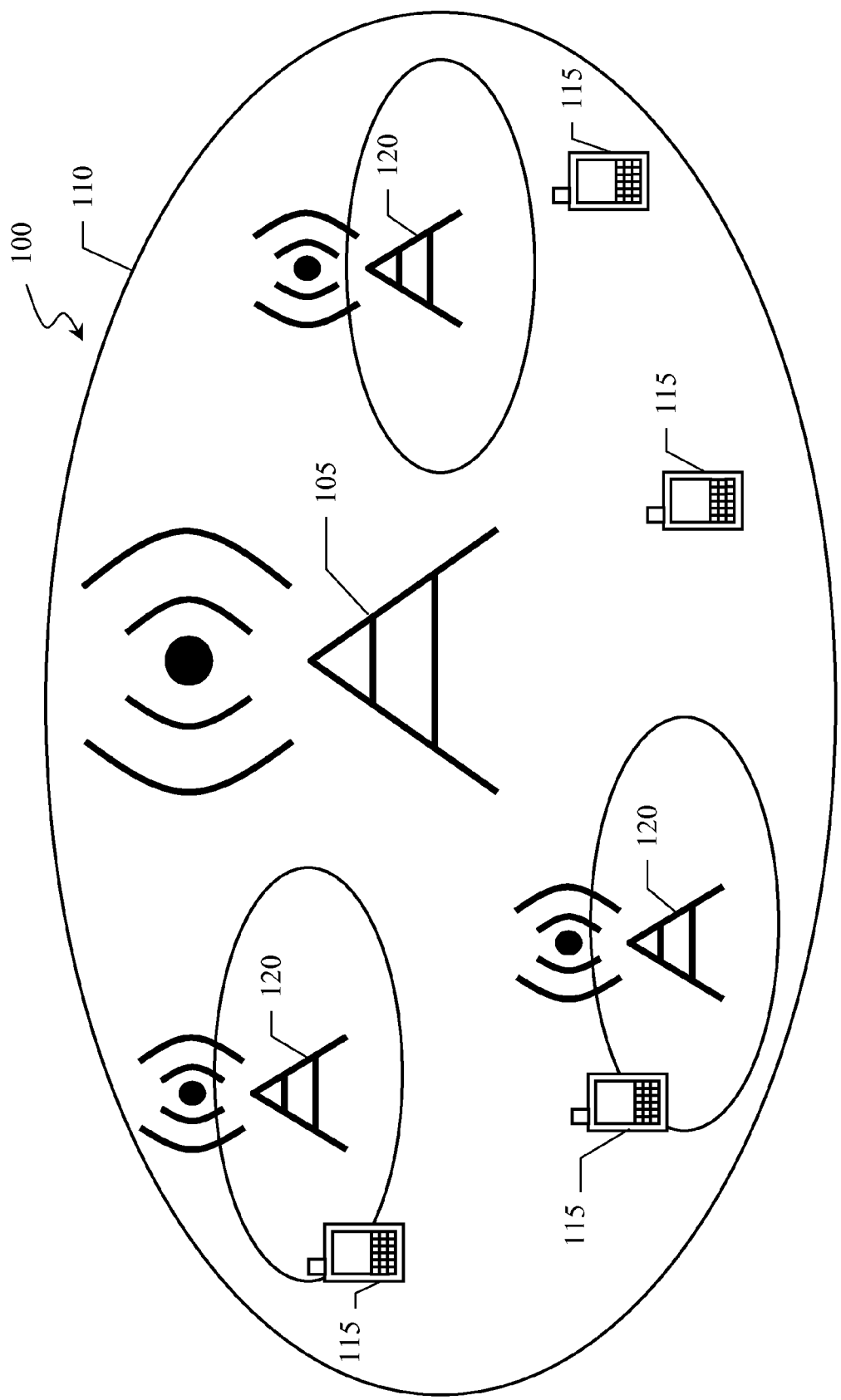

(58) Field of Classification Search
CPC ......... H04L 2010/5651; H04L 47/2433; H04L 47/2441; H04L 47/10; H04L 47/24; H04L 47/30; H04L 47/805
See application file for complete search history.

(56) References Cited

U.S. PATENT DOCUMENTS

| | | | |
|---|---|---|---|
| 2007/0058651 A1* | 3/2007 | Bowen, Jr. .............. | H04L 47/30 370/412 |
| 2010/0142524 A1* | 6/2010 | Garofalo ............ | H04L 12/5693 370/389 |
| 2013/0185445 A1* | 7/2013 | Larkin ................ | H04L 65/1016 709/228 |
| 2016/0308769 A1* | 10/2016 | VerSteeg ................. | H04L 47/12 |

OTHER PUBLICATIONS

International Search Report issued Sep. 6, 2013 in PCT/EP2012/076455 filed Dec. 20, 2012.

* cited by examiner

METHOD AND SYSTEM FOR SCHEDULING RADIO RESOURCES IN CELLULAR NETWORKS

BACKGROUND OF THE INVENTION

Field of the Invention

The present invention generally relates to wireless communications networks, such as cellular networks. More particularly, the present invention relates to radio resources management for cellular networks based on LTE/LTE-Advanced technology.

Overview of the Related Art

Evolution of cellular networks has experimented a significant growth in terms of spread and performance, and has recently brought to 3GPP LTE ("Third Generation Partnership Project Long Term Evolution")/LTE-Advanced standard.

3GPP LTE/LTE-Advanced standard is conceived for allowing data to be high-speed conveyed between a fixed-location transceiver base station or node (e.g., eNodeB) radiating radio waves over a respective land area (network cell) and user equipments (e.g., user terminals, such as cellular phones) within the network cell.

However, due to the growing number of mobile network operators users, LTE/LTE-Advanced cellular networks could fail to meet all users needs for best-effort (e.g., e-mailing and web browsing traffics), multimedia (e.g., audio/video data streaming) and real-time active flows. In fact, multimedia and real-time applications require very high data traffic (e.g., of the order of Mbps), as well as very limiting "Quality of Service" (QoS) (e.g., data packet maximum allowed delivery delay, data packet loss ratio, and jitter), so that their quick and wide spread could make uncontrolled and misconfigured LTE/LTE-Advanced cellular networks inadequate for guaranteeing all users requirements.

In the state of the art, solutions are known aimed at providing improved QoS.

In Giuseppe Piro, Luigi Alfredo Grieco, Gennaro Boggia, and Pietro Camarda, "A *Two-level Scheduling Algorithm for QoS Support in the Downlink of LTE Cellular Networks*", Proc. of European Wireless, EW2010, Lucca, Italy, April 2010, a two-level scheduling algorithm is proposed that comprises an upper level (exploiting an approach bused on discrete-time linear close control loop scheme), and a lower level (a proportional fair scheduler).

In Mongha, G.; Pedersen, K. I.; Kovacs, I. Z.; Mogensen, P. E.; "*QoS oriented Time and Frequency Domain Packet Schedulers for The Utran Long Term Evolution*", Vehicular Technology Conference, 2008 (DOI: 10.1109/VETECS.2008.557), OFDMA downlink general packet scheduling methods for throughput fairness control among users are disclosed. A decoupled time/frequency domain packet scheduler approach is used, where fairness is controlled with frequency domain metric weighting or Time Domain Priority Set Scheduling (TD-PSS) depending on the number of users in the cell.

In Yunzhi Qian; Canjun Ren; Suwen Tang; Ming Chen; "*Multi-service QoS guaranteed based downlink cross-layer resource block allocation algorithm in LTE systems*", Wireless Technology Communications & Signals Processing, 2009 (DOI: 10.1109/WCSP.2009.5371430), a sub-optimal multi-service QoS guaranteed resource block allocation algorithm for downlink LTE system is proposed. All users are classified into three categories according to their channel state information in physical layer and queue state information in data-link layer. Then proposed scheduler assigns resource blocks to predefined three user categories in turns.

In Assaad, M.; "*Frequency-Time Scheduling for streaming services in OFDMA systems*", Wireless Days, 2008 (DOI:10.1109/WD.2008.4812849), a frequency time opportunistic (metric-based cross-layer) scheduler is proposed for balancing trade off between fairness and capacity thereby allowing OFDMA systems to handle streaming services without losing much cell capacity.

In Iturralde, Mauricio; Wei, Anne; Yahiya, Tara; Beylot Andre-Luc, "*Resource allocation for real-time services using cooperative game theory and a virtual token mechanism in LTE networks*", Consumer Communications and Networking Conference, 2012 (DOI: 10.1109/CCNC.2012.6181183), a two level resource allocation scheme is proposed to enhance QoS for multimedia services in LTE downlink system. The resource allocation scheme combines cooperative game theory (for forming coalitions between flow classes to distribute bandwidth fairly), and a modified EXP-RULE algorithm using a virtual token mechanism.

In Sandrasegaran, Kumbesan; Mohd Ramli, Huda Adibah; Basukala, Riyaj; "*Delay-Prioritized Scheduling (PDS) for Real Time Traffic in 3GPP LTE System*", Wireless Communications and Networking Conference, 2010 (DOI: 10.1109/WCNC.2010.5506251), priority-based data packet scheduling is proposed that makes use of data packet delay information and instantaneous downlink channel conditions associated with each user.

SUMMARY OF INVENTION

The Applicant has recognized that none of the cited prior arts is completely satisfactory. In fact:

in "*A Two-level Scheduling Algorithm for QoS Support in the Downlink of LTE Cellular Networks*" work, adoption of a discrete-time close control loop scheme during resource allocation scheduling involves high complexity;

as being devised only for handling GBR flows, the algorithm disclosed in "*QoS oriented Time and Frequency Domain Packet Schedulers for The Utran Long Term Evolution*" cannot be exploited for offering specific performance to multimedia/real-time applications;

in "*Multi-service QoS guaranteed based downlink cross-layer resource block allocation algorithm in LTE systems*", in "*Frequency-Time Scheduling for streaming services in OFDMA systems*", and in "*Resource allocation for real-time services using cooperative game theory and a virtual token mechanism in LTE networks*", no guarantee in terms of data packet maximum allowed delivery delay, data packet loss ratio, and jitter is provided, and in "*Delay-Prioritized Scheduling (PDS) for Real Time Traffic in 3GPP LTE System*" delay requirements of multimedia/real-time flows are considered without optimisation, and in scenarios with high load factor (i.e., high resources consumption with respect to cell resources availability) or with bad channel conditions, thus involving bandwidth waste without offering required QoS to all users.

In view of the above, the Applicant has tackled the problem of devising a simple and effective solution aimed at scheduling radio resources allocation among active flows that require very high data traffic (e.g., multimedia/real-time active flows) while meeting QoS requirements, and best-effort active flows while meeting fairness requirement, in (e.g., LTE/LTE-Advanced) cellular networks.

One or more aspects of the solution according to specific embodiments of the invention are set out in the independent claims, with advantageous features of the same solution that are indicated in the dependent claims, whose wording is enclosed herein verbatim by reference (with any advantageous feature being provided with reference to a specific aspect of the solution according to an embodiment of the invention that applies mutatis mutandis to any other aspect).

More specifically, one aspect of the solution according to embodiments of the present invention relates to a method for scheduling radio resource allocation among active flows within a wireless communication network. The method comprises, at each working period of the scheduling method:

for each active flow, checking the presence of priority data to be transmitted within the current working period based on a comparison between data queued at a reference working period before the current working period and data transmitted between the reference working period and the current working period, classifying as priority active flow each active flow having priority data to be transmitted within the current working period, classifying the remaining active flows as non-priority active flows, the non-priority active flows having non-priority data that need not to be transmitted within the current working period, allocating radio resources among the priority active flows and transmitting the corresponding priority data over the respective allocated resources, and after completing priority data transmission, allocating the radio resources among the non-priority active flows and transmitting the corresponding non-priority data over the respective allocated radio resources until the end of the current working period.

According to an embodiment of the present invention, said checking the presence of priority data to be transmitted within the current working period comprises, for each active flow:

retrieving the number β of working periods required for the active flow to meet a respective maximum allowed delivery delay, and wherein said classifying priority active flows comprises, for each active flow:

selecting as reference working period the (β-2)-th working period before the current working period, and classifying the active flow as priority active flow if data queued at the beginning of the selected reference working period before the current working period is greater than data transmitted between the selected reference working period and the current working period, the difference between said queued data and said transmitted data identifying said priority data to be transmitted within the current working period.

According to an embodiment of the present invention, the method further comprises associating a service class to each priority active flow according to the amount of priority data to be transmitted, said allocating radio resource and said transmitting the corresponding priority data being carried out beginning from priority active flows associated with highest service class to the priority active flows associated with lowest service class.

According to an embodiment of the present invention, each working period comprises a plurality of transmission time intervals, said allocating radio resources among the priority active flows and said transmitting the corresponding priority data over the respective allocated radio resources being carried out at each transmission time interval until completing priority data transmission.

According to an embodiment of the present invention, for each transmission time interval the method further comprises classifying the priority active flows whose priority data transmission has been completed during the current transmission time interval as non-priority active flows.

According to an embodiment of the present invention, said classifying priority active flows comprises classifying as priority active flow each multimedia/real-time active flow having priority data to be transmitted within the current working period, the non-priority active flows comprising non-priority multimedia/real-time active flows and best-effort active flows.

According to an embodiment of the present invention, said best-effort active flows comprise web-browsing, e-mailing and voice data traffic.

According to an embodiment of the present invention, said allocating the radio resources among the non-priority active flows comprises, for each transmission time interval and before the end of the current working period:

computing a metric for each non-priority active flow, and allocating the radio resources among non-priority active flows having highest metrics.

According to an embodiment of the present invention, said metric is in direct relationship to instantaneous data rate reachable by the non-priority active flow and in reverse relation to average rate thereof.

According to an embodiment of the present invention, for each non-priority multimedia/real-time active flow said metric is in direct relationship to queuing delay of a first queued data packet, and in reverse relationship to said maximum allowed transmission delay.

According to an embodiment of the present invention, the metric for each non-priority multimedia/real-time active flow is weighted by an amount depending on the respective service class.

Another aspect of the solution according to embodiments of the present invention relates to a computer program loadable into at least one internal memory of a computer system with input units and output units as well as with processing units, the computer program comprising executable software adapted to carry out the method phases of above, alone or in combination, when running in the computer system.

A further aspect of the solution according to embodiments of the present invention relates to a wireless communications network comprising at least one network cell, the at least one network cell comprising a station providing radio coverage over the network cell and at least one further station for putting into communication the station with at least one corresponding user equipment within the network cell. At least one between said station and said at least one further station comprises a scheduler unit for autonomously scheduling allocation of radio resources among active flows within the network cell. The scheduler unit is configured for:

for each active flow, checking the presence of priority data to be transmitted within the current working period based on a comparison between data queued at a reference working period before the current working period and data transmitted between the reference working period and the current working period, classifying as priority active flow each active flow having priority data to be transmitted within the current working period, classifying the remaining active flows as non-priority active flows, the non-priority active flows having non-priority data that need not to be transmitted within the current working period, allocating radio resources among the priority active flows and transmitting the corresponding priority data over the respective allocated radio resources, and after completing priority data transmission, allocating the radio resources among the non-priority active flows and transmitting the corresponding non-priority data over the respective allocated radio resources until the end of the current working period.

According to an embodiment of the present invention, the wireless communications network is a cellular network based on LTE/LTE-Advanced technology.

According to an embodiment of the present invention, said station has a first transmission power and a first area coverage, and the at least one further station has a second transmission power and a second area coverage, the first transmission power being higher than the second transmission power and the first area coverage being wider than the second area coverage.

The proposed radio resources allocation scheduling allows guaranteeing best QoS for each multimedia/real-time active flow (as data packet delivery delay is respected—i.e., data packets are queued and transmitted before time deadline is going to expire), as well as good fairness among best-effort active flows. Moreover, its compatibility with standard OSI ("Open Systems Interconnection") model requires no change to protocol stack (for example, resource allocation scheduling can be run at Media Access Control (MAC) layer as standard OSI model imposes). Additionally, the proposed radio resources allocation scheduling has decentralized nature, namely it can be applied by each node of the network cell independently from other ones. Thus, no synchronization or control messages exchange among different nodes is required, which makes the proposed resource allocation scheduling particularly useful for LTE/LTE-Advanced heterogeneous cellular networks—i.e. comprising both high-power and wide-coverage nodes, identifying so-called macro cells, and a number of low-power, small-coverage nodes (e.g. micro, pico, femto and/or relay nodes) identifying small cells within the macro cell for enhancing coverage and capacity thereof.

Last but not least, low computational complexity required by the proposed radio resources allocation scheduling makes it particularly adapted to be used in heterogeneous scenarios comprising small cells (e.g., micro cells, pico cells and femto cells) and relay nodes having low computational capability.

BRIEF DESCRIPTION OF THE ANNEXED DRAWINGS

Figure 2:
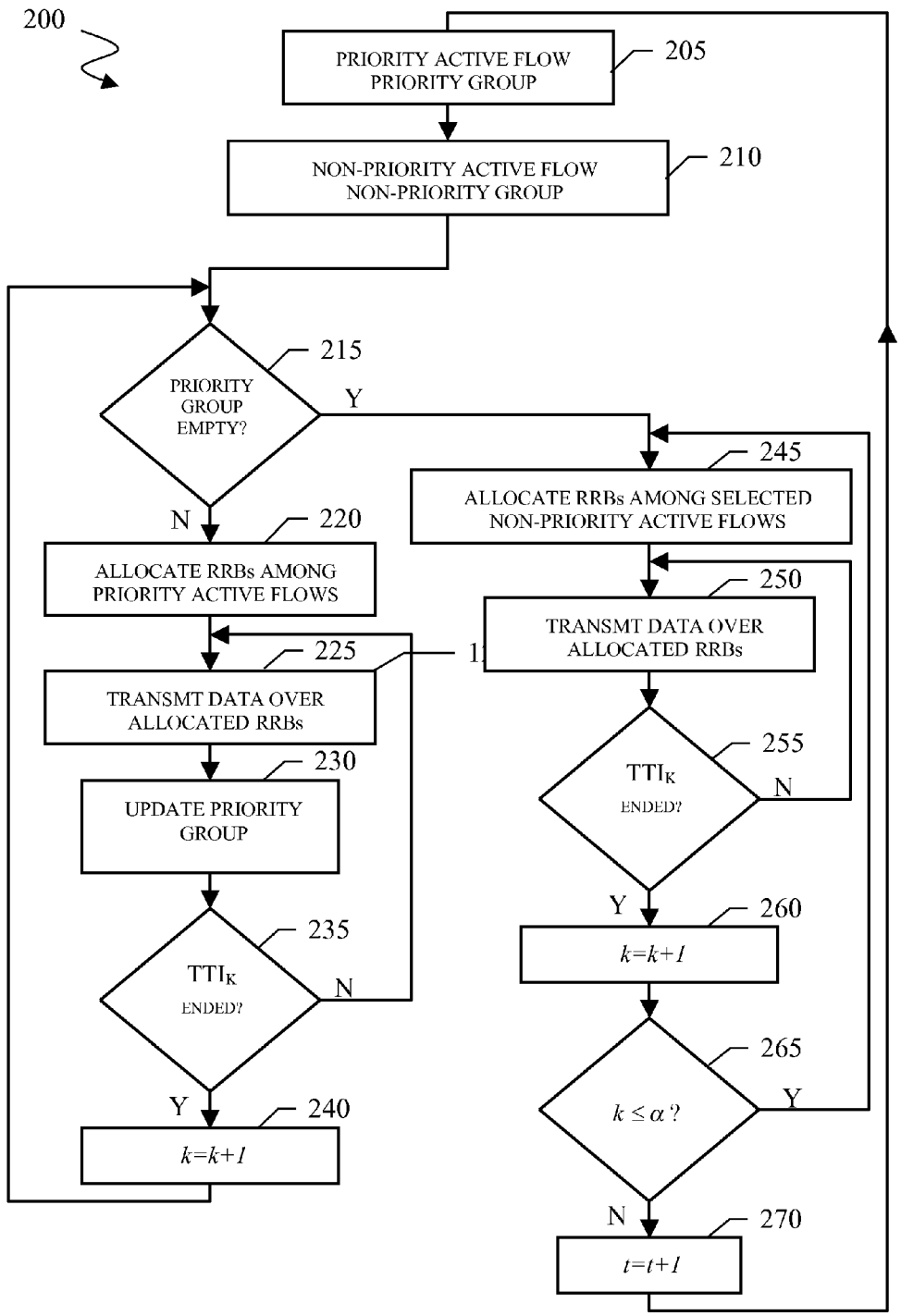
Figure 3:
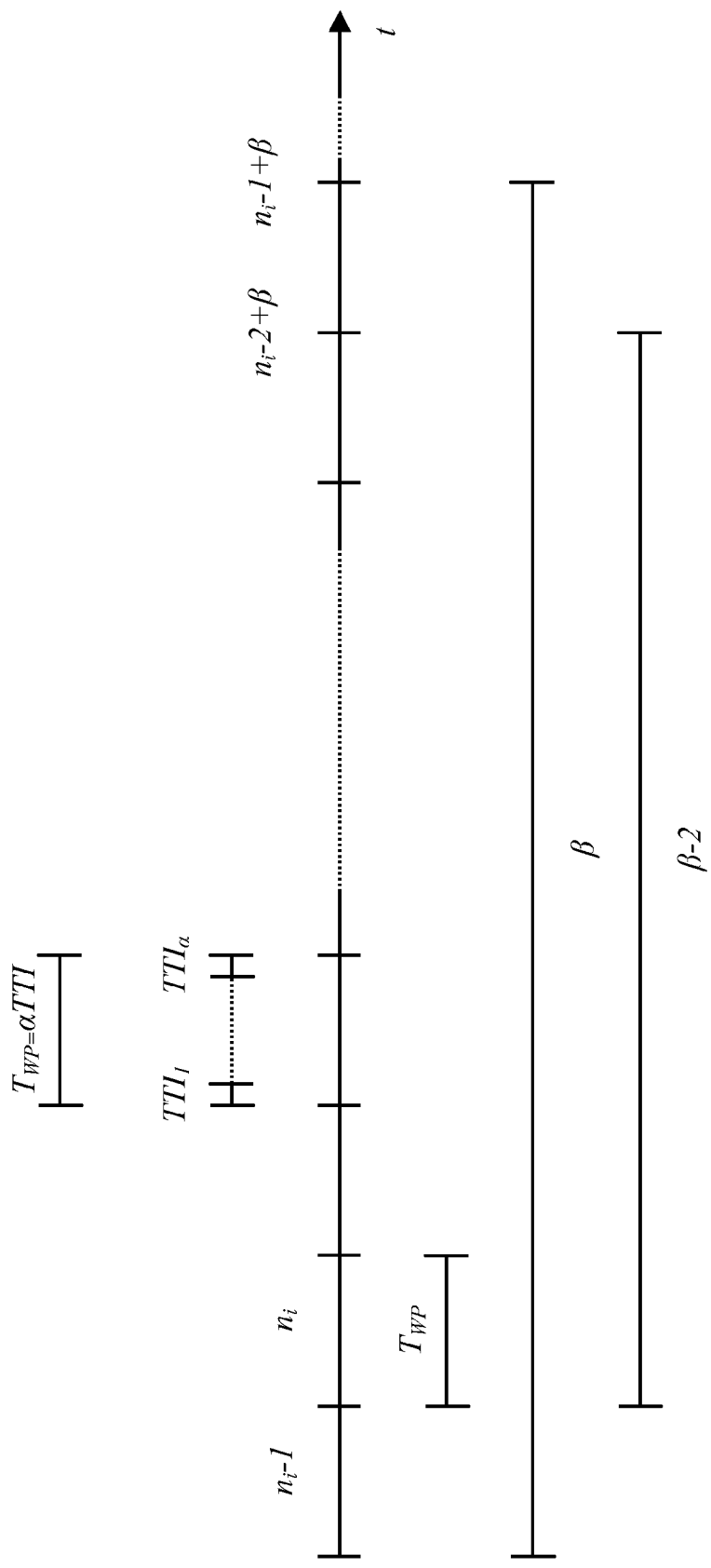

These and other features and advantages of the present invention will be made apparent by the following description of some exemplary and non limitative embodiments thereof; for its better intelligibility, the following description should be read making reference to the attached drawings, wherein:

FIG. 1 schematically shows a cellular network portion wherein the solution according to one or more embodiments of the present invention may be applied;

FIG. 2 schematically shows a flow chart illustrating a sequence of operations of a scheduling algorithm according to an embodiment of the present invention, and FIG. 3 schematically shows a timeline of the scheduling algorithm.

DETAILED DESCRIPTION OF PREFERRED EMBODIMENTS OF THE INVENTION

With reference to the drawings, a cellular network 100 wherein the solution according to one or more embodiments of the invention may be applied is illustrated in FIG. 1. The cellular network 100 (e.g., compliant with the 3GPP LTE/LTE-Advanced standard) comprises a plurality (only one depicted in the figure) of fixed-location transceiver nodes or stations, also known as eNodeB, such as the eNodeB 105. One or more eNodeBs, such as the eNodeB 105, provide for radio coverage over a geographic area, also referred to as network cell, such as the network cell 110, for allowing user equipments (UEs) within the network cell (such as the UEs 115—e.g., mobile phones—within the network cell 110) to exchange data (e.g., web browsing, e-mailing or voice data traffic—also referred to as best-effort flows—and/or data traffic for multimedia/real-time applications—also referred to as multimedia/real-time flows).

As visible from the figure, the cellular network 100 also comprises a plurality (three, in the example at issue) of low-power, small coverage nodes (e.g., pico, micro, femto and/or relay nodes) 120, each one identifying a respective small cell within the network cell (or macro cell) 110 for increasing network capacity (especially at macro cell 110 edges) and to autonomously facilitate communication between some, or all, the UEs 115 within the macro cell 110 and the eNodeB 105.

For the sake of completeness, as well known by those having ordinary skill in the art, the eNodeBs, such as the eNodeB 105, form the radio access network; in turn, the radio access network is generally communicably coupled with one or more core networks (not shown), which may be coupled with other networks, such as Internet and/or public switched telephone networks (not illustrated).

According to an embodiment of the present invention, the eNodeB 105 and the nodes 120 (e.g., through a scheduler unit, or scheduler, thereof) are configured to autonomously implement a scheduling algorithm aimed at properly scheduling radio resources allocation among multimedia/real-time flows and best-efforts flows that are active in the network cell 110 (hereinafter, multimedia/real-time active flows and best-effort active flows).

In the following, radio resources allocation according to 3GPP specifications will be considered. According to 3GPP specifications, radio resources are allocated in time/frequency domain. In time domain, radio resources are distributed every transmission time interval (TTI), each one lasting 1 ms and comprising two time slots of 0.5 ms, whereas in frequency domain the whole bandwidth is divided into 180-kHz sub-channels (corresponding to 12 consecutive and equally spaced sub-carriers). A time/frequency radio resource, spanning over one TTI lasting 1.0 ms in time domain and over one sub-channel in frequency domain, will be referred to as PRB ("Physical Resources Block"), and corresponds to the smallest radio resource that can be allocated to a UE for data transmission.

With reference now to FIG. 2, it schematically shows a flow chart illustrating a sequence of operations of a scheduling algorithm 200 according to an embodiment of the invention. For the sake of description ease, reference will be also made to FIG. 3, which schematically shows a timeline of the scheduling algorithm 200.

The scheduling algorithm 200 has a working period $T_{WP}$, e.g. multiple (by a predefined, preferably integer, amount $\alpha$) of a TTI—thus, $T_{WP} = \alpha TTI$. In other words, each working period $T_{WP}$ comprises $\alpha$ $TTI_k$ ($k=1, 2, \ldots, \alpha$).

At the beginning of each working period $T_{WP}$ (time instant t), multimedia/real-time active flows to be delivered (i.e., checked as having data to be transmitted) within the current working period $T_{WP}$ are classified as priority active flows (as will be discussed shortly, based on a comparison between data queued at a reference working period before the current working period and data transmitted between the reference working period and the current working period), and put into a priority group (block 205)—however, in an alternative embodiment, also best-effort active flows having data to be transmitted within the current working period $T_{WP}$ are classified as priority active flows. Hereinafter, for the sake of description ease, any time instant (such as time instant t) is intended as normalized on working period $T_{WP}$.

Classifying multimedia/real-time active flows as priority active flows is performed by taking into account the following parameters:

$D_i$: maximum allowed delay for delivering (i.e., queuing and transmitting data of) the i-th multimedia/real-time active flow associated with a required (multimedia/real-time) service. $D_i = \beta_i T_{WP}$, where $\beta_i = D_i / T_{WP}$ is the number of working periods $T_{WP}$ required for i-th multimedia/real-time active flow delivering. Thus, assuming that a certain amount of data of the i-th multimedia/real-time active flow have been queued during a working period $T_{WP}$ between $(n_i - 1)$ and $n_i$ time instants, transmission of such queued data should be completed within time instant $t = (n_i - 1 + \beta_i)$—time deadline—for meeting maximum allowed delay $D_i$ requirement.

$Q_i(t - \beta_i + 2)$: amount of data (of the i-th multimedia/real-time active flow) queued at the $(\beta_i - 2)$-th working period $T_{WP}$ before the current working period $T_{WP}$. Thus, as will be readily understood from below, the $(\beta_i - 2)$-th working period $T_{WP}$ before the current working period $T_{WP}$ is used, in the exemplary disclosed embodiment, as reference working period $T_{WP}$ for checking whether an active flow (e.g., a multimedia/real-time active) has priority data to be transmitted within the current working period $T_{WP}$ (anyway, any reference working periods $T_{WP}$, i.e. the reference working period $T_{WP}$ for each i-th active flow could be selected according to respective criteria, e.g. not necessarily dependent from the $\beta_i$ parameter). By definition, the current working period $T_{WP}$ is the $(\beta_i - 1)$-th working period $T_{WP}$ from data queuing at $(t - \beta_i + 2)$ time instant, i.e. the last one available for completing queued data transmission. In the example at issue (data queued between $(n_i - 1)$ and $n_i$ time instants), when $t = (n_i - 2 + \beta_i)$, $Q_i(t - \beta_i + 2)$ parameter is the overall amount of queued data $Q_i(n_i)$ that, from time instant $n_i$ (i.e., at the beginning of the reference working period $T_{WP}$), should be transmitted before time deadline for meeting said maximum allowed delay $D_i$ requirement.

$$\sum_{j=1}^{\beta_i - 2} q_i(t - j)$$

overall amount of data of the i-th multimedia/real-time active flow transmitted during the latest $\beta - 2$ working periods $T_{WP}$ before the current working period $T_{WP}$ (i.e., between the reference working period $T_{WP}$ and the current working period $T_{WP}$). As will be better disclosed shortly, if the current working period $T_{WP}$ is the last one available for delivering the i-th multimedia/real-time active flow, and i-th multimedia/real-time active flow delivery has not been carried out already, the amount $$\sum_{j=1}^{\beta_i - 2} q_i(t - j)$$

is lower than the amount $Q_i(t - \beta_i + 2)$ and the multimedia/real-time i-th active flow will be classified as priority active flow for the current working period $T_{WP}$.

Upon reception/calculation/retrieval of $D_i$, $Q_i(t - \beta_i + 2)$ and $$\sum_{j=1}^{\beta_i - 2} q_i(t - j)$$

parameters of each i-th multimedia/real-time active flow, i-th multimedia/real-time active flows are classified as priority active flows (for the current working period Tw) if $$Q_i(t - \beta_i + 2) - \sum_{j=1}^{\beta_i - 2} q_i(t - j) > 0,$$

namely if the overall amount of data (of the i-th multimedia/real-time active flow) queued at the beginning of $(\beta_i - 2)$-th working period $T_{WP}$ before the current working period $T_{WP}$ is greater than the overall amount of data transmitted during the latest $\beta - 2$ working periods $T_{WP}$ before the current working period $T_{WP}$ (i.e., between the reference working period $T_{WP}$ and the current working period $T_{WP}$).

If the inequality of above is not satisfied, it means that, for the i-th multimedia/real-time active flow, queued data having time deadline at $(t+1)$ time instant have not been transmitted already at (current) time instant t. Thus, the current working period $T_{WP}$ is the last one available for transmitting such queued data, and the i-th multimedia/real-time active flow is classified as priority active flow.

In order to meet maximum allowed delay $D_i$ requirement, the following amount of data $q_i(t)$ (or priority data) has to be transmitted between t and $(t+1)$ time instants:

$$q_i(t) = Q_i(t - 2 + \beta_i) - \sum_{j=1}^{\beta_i - 2} q_i(t - j)$$

If instead the inequality of above is satisfied, it means that, for the i-th multimedia/real-time active flow, queued data having time deadline at $(t+1)$ time instant have already been transmitted before (current) time instant t—thus, the i-th multimedia/real-time active flow is not considered as priority active flow.

All i-th multimedia/real-time active flows not considered as priority active flows are classified, together with best-effort active flows, as non-priority active flows and put into a non-priority group (block 210).

Distinguishing multimedia/real-time active flows from best-effort active flows, and classifying as priority active flows the multimedia/real-time active flows having priority data to be transmitted for meeting target delay $D_i$ (and hence QoS) requirement, identifies an upper-layer scheduling (ULS) entity, as opposed to lower-layer scheduling LLS entities that, as will be discussed below, are instead aimed at properly allocating PRBs among priority and non-priority active flows.

In order to make the scheduling algorithm 200 compliant with 3GPP specifications, PRB and data transmission are performed at each $TTI_k$.

At the first $TTI_l$ of the current working period $T_{WP}$ (after ULS scheduling), a priority active flows LLS (or $LLS_P$) entity is run. Broadly speaking, at each $TTI_k$, and until the priority group has emptied, $LLS_P$ entity allocates PRBs among the active flows within the priority group, transmits the priority data $q_i(t)$, and erases the i-th priority flow whose priority data $q_i(t)$ have been completely transmitted from the priority group.

In the proposed scheduling algorithm 200, $LLS_P$ entity is identified by functional blocks 215-240.

In this respect, the scheduling algorithm 200 checks, at the decision block 215, whether the priority group is empty. In the negative case, exit branch N of the decision block 215, at the current $TTI_k$ PRB allocation among the i-th priority active flows is carried out at block 220 (e.g., by exploiting Proportional Fair, Maximum Throughput, or Earliest Due Date scheduling strategies), priority data $q_i(t)$ are transmitted over allocated PRBs (block 225), and the priority group is updated by erasing the i-th active flows whose priority data transmission has been completed within the current $TTI_k$ (see block 230), until current $TTI_k$ ending (see decision block 235).

More specifically, priority data $q_i(t)$ are transmitted (and the priority group updated) while current $TTI_k$ has not ended, as conceptually represented in the figure by loop-connection between exit branch N of the decision block 235 and block 225.

Upon current $TTI_k$ ending (exit branch Y of the decision block 235), the following $TTI_k$ is considered by updating the k value (see block 240), thereafter the operation flow goes back to block 215, where $LSS_P$ entity is run (as before) until the priority group has not emptied.

Before the new $LSS_P$ entity is run, a check aimed at ascertaining whether k≤α—i.e. the (new) current $TTI_k$ is still comprised within the current working $T_{WP}$—could be performed (so as to start a new working period $T_{WP}$ otherwise). However, this is not necessary. Indeed, as will be readily understood shortly, being the scheduling algorithm 200 also conceived for handling non-priority multimedia/real-time active flows whose queued data delay is closing to maximum allowed delay before best-effort active flows, priority data are certainly transmitted before working period $T_{WP}$ end.

Considering back the decision block 215, when all priority flows have transmitted the respective priority data $q_i(t)$ (exit branch Y), a non-priority active flows LLS (or $LLS_{NP}$) entity is run (functional blocks 245-270). As far as $LLS_{NP}$ entity running is concerned, analogous functional block will not be detailed again.

Broadly speaking, at each $TTI_k$, and until ending of all available $TTI_k$s of the current working period $T_{WP}$ (see decision block 265), PRBs allocation among non-priority active flows is carried out (see block 245), and corresponding (non-priority) data are transmitted over allocated PRBs (block 250) until current $TTI_k$ ending (see loop-connection between decision block 255 and block 245).

PRBs allocation is performed among selected non-priority active flows. In this respect, a metric is calculated for both multimedia/real-time active flows and best-effort active flows, and the active flows having highest metrics are selected for PRBs allocation.

Preferably, the metric for best-effort active flows ($M_{BEi}$) is calculated as $$M_{BEi}=r_i/R_i,$$

where $r_i$ is the instantaneous data rate reachable by the i-th active flow, being known the channel quality measured by UE that acts as source or destination of the active flow, and $R_i$ is the average rate of the i-th active flow.

As mentioned above, in order to provide a different weight to non-priority multimedia/real-time active flows whose queued data delay is close to maximum allowed delay $D_i$, the metric for each i-th multimedia/real-time active flow ($M_{Ai}$) is calculated as:

$$M_{Ai}=r_i/R_i*\delta HOL*(D_i-HOL)^\gamma$$

where HOL is the Head of Line packet delay of a given queue, and γ is a factor (e.g., equal to, or greater than 1) taking into account the weight of time deadline assigned to the considered data packet.

This guarantees a major priority to multimedia/real-time active flows and fairness among best-effort applications.

Upon current $TTI_k$ ending (exit branch Y of the decision block 255), the following $TTI_k$ is considered by updating the k value (see block 260), and, upon current working period $T_{WP}$ ending (exit branch Y of the decision block 265), the following working period is considered (block 270) and the scheduling algorithm 200 is run back.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

For example, the proposed scheduling algorithm could be extended, at the $LLS_P$ level, for differently handling multimedia/real-time active flows belonging to different service classes (e.g., gold, silver, bronze) according to the amount of priority data to be transmitted.

In this respect, PRBs allocation and priority data transmission can be carried out beginning from priority active flows associated with highest (e.g., gold) service class to priority active flows associated with lowest (e.g., bronze) service class.

Additionally or alternatively, weighted metrics could be used (e.g., in case that $LLS_P$ makes use of opportunistic, such as Proportional Fair scheduling approaches). In this respect, for each (multimedia/real-time) active flow, weight could be applied to the metric calculated by opportunistic scheduling approach. By way of example only, such weight can be set as having decreasing value from gold to bronze service classes (e.g., 1.6, 1.3 and 1, respectively).

In addition, analogous considerations apply if the wireless communication network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to wireless communication network based on the LTE/LTE-Advanced standard, it should be understood that it is not in the intentions of the Applicant to be limited to the implementation of any particular wireless communication system architecture or protocol. In this respect, it is also possible to provide that, with suitable simple modifications, the proposed scheduling algorithm may be applied also to other open or proprietary communication protocols, for example, WiMAX, among them.

The invention claimed is:

1. A method for scheduling radio resource allocation among active flows within a wireless communication network, the method comprising, at each working period of the scheduling method:
   for each active flow, checking presence of priority data to be transmitted within the current working period based on a comparison between data queued at a reference working period before the current working period and data transmitted between the reference working period and the current working period;
   classifying as a priority active flow each active flow having priority data to be transmitted within the current working period;
   classifying remaining active flows as non-priority active flows, the non-priority active flows having non-priority data that need not to be transmitted within the current working period;
   allocating radio resources among the priority active flows and transmitting the corresponding priority data over the respective allocated resources; and
   after completing priority data transmission, allocating the radio resources among the non-priority active flows and transmitting the corresponding non-priority data over the respective allocated radio resources until the end of the current working period.

2. The method according to claim 1, wherein the checking the presence of priority data to be transmitted within the current working period comprises, for each active flow:
   retrieving a number $\beta$ of working periods required for the active flow to meet a respective maximum allowed delivery delay; and
   wherein the classifying priority active flows comprises, for each active flow:
   selecting as reference working period the ($\beta$-2)-th working period before the current working period, and
   classifying the active flow as priority active flow if data queued at the beginning of the selected reference working period before the current working period is greater than data transmitted between the selected reference working period and the current working period, the difference between the queued data and the transmitted data identifying the priority data to be transmitted within the current working period.

3. The method according to claim 2, further comprising associating a service class to each priority active flow according to an amount of priority data to be transmitted, the allocating radio resource and the transmitting the corresponding priority data being carried out beginning from priority active flows associated with a highest service class to the priority active flows associated with a lowest service class.

4. The method according to claim 1, wherein each working period comprises a plurality of transmission time intervals, the allocating radio resources among the priority active flows and the transmitting the corresponding priority data over the respective allocated radio resources being carried out at each transmission time interval until completing priority data transmission.

5. The method according to claim 4, for each transmission time interval the method further comprising classifying the priority active flows whose priority data transmission has been completed during the current transmission time interval as non-priority active flows.

6. The method according to claim 1, wherein the classifying priority active flows comprises classifying as priority active flow each multimedia/real-time active flow having priority data to be transmitted within the current working period, the non-priority active flows comprising non-priority multimedia/real-time active flows and best-effort active flows.

7. The method according to claim 6, wherein the best-effort active flows comprise web-browsing, e-mailing, and voice data traffic.

8. The method according to claim 6, wherein, for each transmission time interval and before an end of the current working period, the allocating the radio resources among the non-priority active flows comprises:
   computing a metric for each non-priority active flow, and
   allocating the radio resources among non-priority active flows having highest metrics.

9. The method according to claim 8, wherein the metric is in direct relationship to an instantaneous data rate reachable by the non-priority active flow and in reverse relation to an average rate thereof.

10. The method according to claim 9, wherein, for each non-priority multimedia/real-time active flow the metric is in direct relationship to a queuing delay of a first queued data packet, and in reverse relationship to a maximum allowed transmission delay.

11. The method according to claim 10, wherein the metric for each non-priority multimedia/real-time active flow is weighted by an amount depending on a respective service class.

12. A non-transitory computer readable medium including computer program loadable into at least one internal memory of a computer system with input units, output units, and processing units, the computer program comprising executable software configured to carry out the method according to claim 1, when running in the computer system.

13. A wireless communications network comprising:

at least one network cell, the at least one network cell comprising a station providing radio coverage over the network cell and at least one further station for putting into communication the station with at least one corresponding user equipment within the network cell, at least one between the station and the at least one further station comprising a scheduler unit for autonomously scheduling allocation of radio resources among active flows within the network cell;

the scheduler unit configured to:

for each active flow, check presence of priority data to be transmitted within the current working period based on a comparison between data queued at a reference working period before the current working period and data transmitted between the reference working period and the current working period;

classify as a priority active flow each active flow having priority data to be transmitted within the current working period;

classify remaining active flows as non-priority active flows, the non-priority active flows having non-priority data that need not to be transmitted within the current working period;

allocate radio resources among the priority active flows and transmit the corresponding priority data over the respective allocated radio resources; and after completing priority data transmission, allocate the radio resources among the non-priority active flows and transmitting the corresponding non-priority data over the respective allocated radio resources until the end of the current working period.

14. The wireless communications network according to claim 13, wherein the wireless communications network is a cellular network based on LTE/LTE-Advanced technology.

15. The wireless communication network according to claim 14, wherein the station has a first transmission power and a first area coverage, and the at least one further station has a second transmission power and a second area coverage, the first transmission power being higher than the second transmission power and the first area coverage being wider than the second area coverage.

* * * * *